US009123975B2

(12) United States Patent
Kolosnitsyn et al.

(10) Patent No.: US 9,123,975 B2
(45) Date of Patent: *Sep. 1, 2015

(54) LITHIUM-SULPHUR BATTERY WITH HIGH SPECIFIC ENERGY

(71) Applicant: Oxis Energy Limited, Abingdon (GB)

(72) Inventors: Vladimir Kolosnitsyn, Ufa (RU); Elena Karaseva, Ufa (RU)

(73) Assignee: Oxis Energy Limited, Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,944

(22) Filed: Jan. 3, 2014

(65) Prior Publication Data

US 2014/0120428 A1    May 1, 2014

Related U.S. Application Data

(63) Continuation of application No. 12/787,006, filed on May 25, 2010, now Pat. No. 8,647,769, which is a continuation of application No. 11/526,876, filed on Sep. 26, 2006, now abandoned.

(60) Provisional application No. 60/734,320, filed on Nov. 8, 2005, provisional application No. 60/721,062, filed on Sep. 28, 2005.

(30) Foreign Application Priority Data

Sep. 26, 2005   (GB) .................................. 0519491.5

(51) Int. Cl.
*H01M 4/13*        (2010.01)
*H01M 10/0569*     (2010.01)
(Continued)

(52) U.S. Cl.
CPC .......... *H01M 10/0569* (2013.01); *H01M 4/134* (2013.01); *H01M 4/136* (2013.01);
(Continued)

(58) Field of Classification Search
CPC ... H01M 10/056; H01M 4/133; H01M 4/136; H01M 4/137; H01M 4/58; H01M 4/5815; H01M 4/60; H01M 10/052
USPC .......................................... 429/218.1, 231.95
See application file for complete search history.

(56) References Cited

U.S. PATENT DOCUMENTS 3,030,720 A * 4/1962 Osswald et al. .................. 428/8
4,410,609 A * 10/1983 Peled et al. .................... 429/105
(Continued)

FOREIGN PATENT DOCUMENTS

JP        2005-108724        4/2005

OTHER PUBLICATIONS

Office Action issued for Korean Patent Application No. 10-2013-7031637 issued Jan. 27, 2014.

*Primary Examiner* — Helen O Conley
(74) *Attorney, Agent, or Firm* — Meyertons, Hood, Kivlin, Kowert & Goetzel, P.C.; Eric B. Meyertons

(57) ABSTRACT

The invention provides for a method of discharging a chemical source of electric energy in two stages. The chemical source of electric energy comprises a positive electrode (cathode) including sulphur or sulphur-based organic compounds, sulphur-based polymeric compounds or sulphur-based inorganic compounds as a depolarizer, a negative electrode (anode) made of metallic lithium or lithium-containing alloys, and an electrolyte comprising a solution of at least one salt in at least one aprotic solvent. The method comprises the steps of configuring the chemical source of electric energy to generate soluble polysulphides in the electrolyte during a first stage of a two stage discharge process, and selecting the quantity of sulphur in the depolarizer and the volume of electrolyte in a way that after the first stage discharge of the cathode, the concentration of the soluble polysulphides in the electrolyte is at least seventy percent (70%) of a saturation concentration of the polysulphides in the electrolyte.

6 Claims, 1 Drawing Sheet

Discharge curve of a Li-S battery

(51) Int. Cl.
| | |
|---|---|
| H01M 4/134 | (2010.01) |
| H01M 4/136 | (2010.01) |
| H01M 4/137 | (2010.01) |
| H01M 4/58 | (2010.01) |
| H01M 4/60 | (2006.01) |
| H01M 10/052 | (2010.01) |
| H01M 10/0568 | (2010.01) |
| H01M 10/05 | (2010.01) |
| H01M 4/133 | (2010.01) |

(52) U.S. Cl.
CPC .............. *H01M 4/137* (2013.01); *H01M 4/58* (2013.01); *H01M 4/581* (2013.01); *H01M 4/5815* (2013.01); *H01M 4/60* (2013.01); *H01M 10/05* (2013.01); *H01M 10/052* (2013.01); *H01M 10/0568* (2013.01); *H01M 4/133* (2013.01); *Y02E 60/122* (2013.01)

(56) References Cited

U.S. PATENT DOCUMENTS

| | | | |
|---|---|---|---|
| 2001/0008736 A1* | 7/2001 | Fanta et al. | 429/307 |
| 2002/0192557 A1* | 12/2002 | Choi et al. | 429/232 |
| 2004/0002002 A1* | 1/2004 | Mizuta et al. | 429/188 |

* cited by examiner

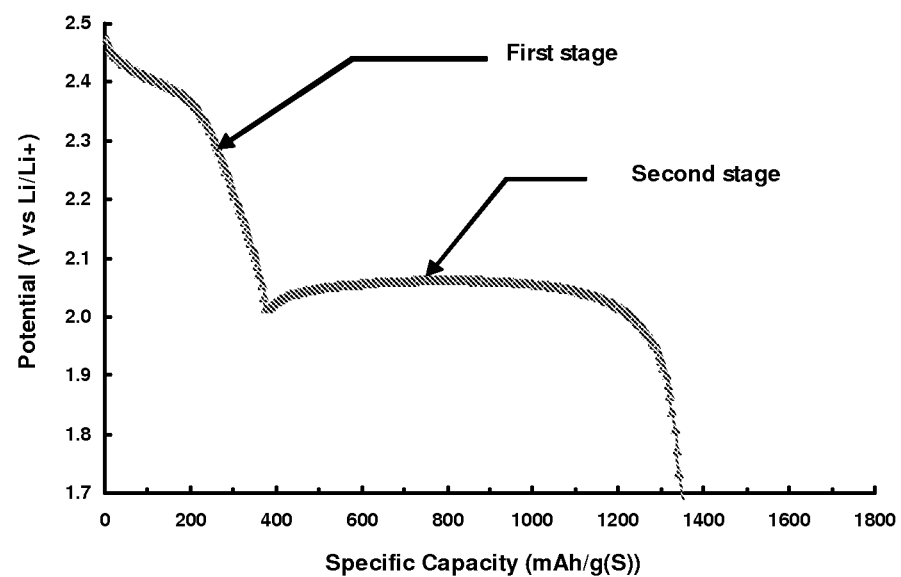
Discharge curve of a Li-S battery

LITHIUM-SULPHUR BATTERY WITH HIGH SPECIFIC ENERGY

PRIOR APPLICATION DATA

The present application is a continuation of U.S. patent application Ser. No. 12/787,006, filed May 25, 2010, which is a continuation of U.S. patent application Ser. No. 11/526,876, filed Sep. 26, 2006, which claims benefit from prior U.S. provisional patent application No. 60/734,320, filed Nov. 8, 2005, entitled "LITHIUM-SULPHUR BATTERY WITH HIGH SPECIFIC ENERGY"; from prior U.S. provisional patent application No. 60/721,062, filed Sep. 28, 2005, entitled "LITHIUM-SULPHUR BATTERY WITH HIGH SPECIFIC ENERGY", and from UK patent application no. 0519491.5, filed Sep. 26, 2005 each of which being incorporated by reference herein in its entirety.

FIELD OF THE INVENTION

The present invention relates to electrochemical power engineering, in particular it relates to chemical sources of electric energy (cells or batteries) comprising negative electrodes made of alkali metals and positive electrodes comprising sulphur and/or sulphur-based non-organic or organic (including polymeric) compounds as an electrode depolarizer substance.

BACKGROUND

The lithium-sulphur electrochemical system has a high theoretical specific energy of 2600 Wh/kg (D. Linden, T. B. Reddy, Handbook of batteries, third ed., McGraw-Hill, New-York, 2001), and is therefore of great interest at present. Specific energy is defined as the ratio of the energy output of a cell or battery to its weight, and is expressed in Wh/kg. The term specific energy is equivalent to the term gravimetric energy density.

It has been proposed to use various materials as a depolarizer substance for the positive electrode in lithium-sulphur batteries: elemental sulphur (U.S. Pat. Nos. 5,789,108; 5,814,420), sulphur-organic compounds (U.S. Pat. No. 6,090,504), sulphur-containing polymers (U.S. Pat. Nos. 6,201,100; 6,174,621; 6,117,590), and solutions of sulphur or lithium polysulphides in aprotic electrolyte systems (Rauh R. D., Abraham K. M., Pearson G. F., Surprenant J. K., Brummer S. B.: "A lithium/dissolved sulphur battery with an organic electrolyte", J. Electrochem. Soc. 1979, vol. 126, no. 4, pp 523-527; Yamin H., Peled E.: "Electrochemistry of a nonaqueous lithium/sulphur cell", J. of Power Sources, 1983, vol. 9, pp 281-287).

Solutions of lithium salts in aprotic dipolar solvents (typically linear or cyclic ethers) or their mixtures have been used as electrolytes in lithium-sulphur batteries (Yamin H., Penciner J., Gorenshtain A., Elam M., Peled E.: "The electrochemical behavior of polysulphides in tetrahydrofuran", J. of Power Sources, 1985, vol. 14, pp 129-134; Yamin H., Gorenshtein A., Penciner J., Sternberg Y., Peled E.: "Lithium sulphur battery. oxidation/reduction mechanisms of polysulphides in THF solution", J. Electrochem. Soc., 1988, vol. 135, no. 5, pp 1045-1048; Duck-Rye Chang, Suck-Hyun Lee, Sun-Wook Kim, Hee-Tak Kim: "Binary electrolyte based on tetra(ethylene glycol) dimethyl ether and 1,3-dioxolane for lithium-sulphur battery", J. of Power Sources, 2002, vol. 112, pp 452-460).

The practical specific energy of a typical chemical source of electric energy usually reaches 20-30% of the theoretical maximum value of the specific energy of the electrochemical system that is employed. This is because various auxiliary elements (the separator, the current collectors of the electrodes, the electrolyte and other components) of the battery contribute to its total weight in addition to the electrode depolarizers. The auxiliary elements of the battery design do not themselves take part in the electrochemical reaction itself, but are provided so as to facilitate the reaction process and to promote normal functioning of the battery.

The value of the practical specific energy for laboratory lithium-sulphur cells generally reaches only 10-15% of its theoretical value, and is typically around 250-350 Wh/kg (J. Broadhead, T. Skotheim: "A safe, fast-charge, two-volt lithium/polymer cathode 'AA'-size cell with a greater than 250 Wh kg-1 energy density", Journal of Power Sources, 65 (1997), 1-2, 213-218; Peled E., Gorenshtein A., Segal M., Sternberg Y.: "Rechargeable lithium-sulphur battery (extended abstract)", J. of Power Sources, 1989, vol. 26, pp 269-271).

SUMMARY

Disregarding the weight of the auxiliary battery elements, the difference between the theoretical and the practical values for the specific energies of laboratory lithium-sulphur cells is due to insufficient utilization of the positive electrode depolarizer (sulphur or sulphur-based compounds) and the excess quantity of electrolyte that is generally provided.

Embodiments of the present invention seek at least substantially to optimize the electrolyte quantity in lithium-sulphur cells, and thereby to improve their practical specific energy.

One embodiment includes a chemical source of electric energy comprising a positive electrode (cathode) including sulphur or sulphur-based organic compounds, sulphur-based polymeric compounds or sulphur-based inorganic compounds as a depolarizer, a negative electrode (anode) made of metallic lithium or lithium-containing alloys, and an electrolyte comprising a solution of at least one salt in at least one aprotic solvent, the chemical source of electric energy being configured to generate soluble polysulphides in the electrolyte during a first stage of a two stage discharge process, characterised in that the quantity of sulphur in the depolariser and the volume of electrolyte are selected such that, after first stage discharge of the cathode, the concentration of the soluble polysulphides in the electrolyte is at least 70% of a saturation concentration of the polysulphides in the electrolyte.

In another embodiment the quantity of sulphur in the depolariser and the volume of electrolyte are selected such that, after complete discharge of the cathode, the concentration of the soluble lithium polysulphides in the electrolyte is from 70 to 90% of a saturation concentration of the polysulphides in the electrolyte.

In another embodiment the depolarizer includes sulphur, carbon black and polyethylene oxide.

In another embodiment the electrolyte includes a solution of one or several lithium salts selected from the group consisting of: lithium trifluoromethanesulphonate, lithium perchlorate, lithium trifluoromethanesulfonimide, lithium hexafluorophosphate, lithium hexafluoroarsenate, lithium tetrachloroaluminate, tetraalkylammonium salt, lithium chloride, lithium bromide and lithium iodide; in one or several solvents selected from the group consisting of: dioxolane, tetrahydrofuran, dimethoxyethane, diglyme, triglyme, tetraglyme, dialkyl carbonates, sulfolane and butyrolactone.

BRIEF DESCRIPTION OF THE DRAWINGS

For a better understanding of the present invention and to show how it may be carried into effect, reference shall now be made by way of example to the accompanying drawing, in which:

FIG. 1 is a plot showing the two stage discharge process of a lithium-sulphur battery of an embodiment of the present invention.

DETAILED DESCRIPTION OF THE INVENTION

In the following detailed description, numerous specific details are set forth in order to provide a thorough understanding of the present invention. However, it will be understood by those skilled in the art that the present invention may be practiced without these specific details. In other instances, well-known methods, procedures, and components have not been described in detail so as not to obscure the present invention.

The specific energy of a chemical source of electric energy is determined by the theoretical specific energy of the selected electrochemical system, as well as by the weight of auxiliary components required to ensure the proper operation of the chemical source of electric energy (e.g. a separator, current collectors of electrodes, a binder, current conducting additives, an electrolyte and other components), and also by the degree (efficiency) of utilization of the depolarizer. The weight of the auxiliary components generally makes up 70-80% of the total weight of the cell. In order to achieve improved specific energy characteristics, the weight of the auxiliary components must be reduced.

The weight of the electrolyte is a significant part of the total weight of the chemical source of electric energy. The electrolyte performs supplementary functions in chemical sources of electric energy with solid depolarizers, for example supporting the electrochemical reaction process and providing ion transport between the electrodes. Therefore in such systems it is desirable to minimize the quantity of the electrolyte.

However, in chemical sources of electric energy comprising liquid cathodes, the electrolyte may consist of a salt solution in a liquid depolarizer (for example a solution of lithium tetrachloroaluminate in thionyl chloride), or a salt solution in a mixture of a liquid depolarizer and an aprotic solvent (for example a solution of lithium bromide in a mixture of sulphurous anhydride and acetonitrile), or a salt solution in a solution of a liquid depolarizer in an aprotic solvent (for example a lithium perchlorate solution in a solution of lithium polysulphide in tetrahydrofuran) (D. Linden, T. B. Reddy: "Handbook of batteries", third ed., McGraw-Hill, New York, 2001).

The electrolyte in chemical sources of electric energy comprising liquid cathodes performs a wider range of functions than the electrolyte used in systems having solid cathodes. The electrolyte not only supports the electrochemical reaction and ion transport between the electrodes, but serves as a solvent for a depolarizer of the positive electrode. Accordingly, when aprotic solvents are used as a component of a liquid cathode, the specific power characteristics of chemical sources of electric energy with liquid cathodes depend on the content of the aprotic solvents and hence on the content of the liquid cathode.

Despite the fact that sulphur and lithium sulphide are poorly soluble in aprotic solvents, lithium-sulphur batteries are classified as batteries with liquid cathodes. This is because of the formation of well-soluble products, lithium polysulphides, that occur during charge and discharge of such batteries.

The liquid cathode is formed in lithium-sulphur batteries during discharge of the sulphur electrode. The electrochemical oxidation of sulphur is realised by way of two stages. In the first stage, long-chain lithium polysulphides (which are well-soluble in aprotic electrolytes) are generated during the electrochemical oxidation of elemental sulphur, which is non-soluble or poorly soluble in most electrolyte systems (Equation 1).

Equation 1

The solution of lithium polysulphides in electrolyte which is formed in the initial discharge phase is known to be a liquid cathode.

In the second stage, an electrochemical reduction of soluble lithium polysulphides occurs (Equation 2). During this phase, sulphide or disulphide anions are formed, which, by reacting with lithium cations, form non-soluble products: lithium sulphide and lithium disulphide.

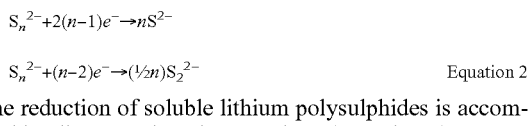

Equation 2

The reduction of soluble lithium polysulphides is accompanied by disproportionation reactions (Equation 3).

Equation 3

The two stage mechanism of sulphur reduction is clearly seen in the discharge curves for lithium-sulphur batteries as shown in FIG. 1. It is represented by two discharge regions: a first region in the voltage range from 2.5-2.4V to 2.1-1.9V corresponds to the first discharge phase (Equation 1); and a second region in the voltage range from 2.1-1.9V to 1.8-1.5V corresponds to the second (Equation 2).

The efficiency of sulphur utilization in lithium-sulphur batteries is determined by the quantitative ratio of sulphur to electrolyte.

When the amount of electrolyte is relatively low, not all of the sulphur and long-chain lithium polysulphides undergo subsequent electrochemical reduction because of the formation of highly viscous saturated solutions of polysulphides. This results in a decrease in the practical specific energy of lithium-sulphur batteries.

When there is an excess of electrolyte, the specific energy of lithium-sulphur batteries is still lower than the maximum possible because of the quantitative excess of electrolyte which contributes to the overall weight of a cell. A particular ratio of sulphur to electrolyte should be maintained for each type of electrolyte so as to reach or at least approach the maximum possible practical specific energy.

This ratio depends on the properties of the electrolyte system. In particular, the ratio depends on the solubility of initial, intermediate and final compounds.

To achieve the best practical specific energy characteristics of lithium-sulphur batteries, the electrolyte content in the batteries should be chosen in a way that provides complete dissolution of lithium polysulphides (formed at the first stage)

with formation of liquid cathodes with moderate viscosity. The present applicant has found that such a condition is provided when, during discharge of the sulphur electrode, the concentration of soluble polysulphides in the electrolyte is at least 70%, and preferably from 70 to 90%, of the saturation concentration at operating temperature and pressure.

In one embodiment, the operating temperature may be approximately −40 to +150 degrees Celsius. In another embodiment, the operating temperature may be approximately −20 to +110 degrees C., or −10 to +50 degrees C.

In one embodiment, the operating pressure may be approximately 5 mmHg to 76000 mmHg (0.0066 to 100 atm). In another embodiment, the operating pressure may be approximately 20 mmHg to 38000 mmHg (0.026 to 50 atm), or for example approximately 1 atm.

Embodiments of the present invention may operate at standard temperature and pressure, for example at approximately 25 degrees C. and 1 atm.

Embodiments of the present invention may operate at other temperature and pressure ranges.

According to the present invention, there is provided a chemical source of electric energy comprising a positive electrode (cathode) including sulphur or sulphur-based organic compounds, sulphur-based polymeric compounds or sulphur-based inorganic compounds as a depolarizer, a negative electrode (anode) made of metallic lithium or lithium-containing alloys, and an electrolyte comprising a solution of at least one salt in at least one aprotic solvent, the chemical source of electric energy being configured to generate soluble polysulphides in the electrolyte during a first stage of a two stage discharge process, characterised in that the quantity of sulphur in the depolariser and the volume of electrolyte are selected such that, after first stage discharge of the cathode, the concentration of the soluble polysulphides in the electrolyte is at least 70% of a saturation concentration of the polysulphides in the electrolyte.

Preferably, the quantity of sulphur in the positive electrode and the volume of electrolyte are selected such that, after first stage discharge of the cathode, the concentration of the soluble polysulphides in the electrolyte is from 70 to 90% of a saturation concentration of the polysulphides in the electrolyte.

In one particular embodiment, the depolarizer includes sulphur, carbon black and polyethylene oxide.

The electrolyte may comprise a solution of one or several lithium salts selected from the group consisting of: lithium trifluoromethanesulphonate, lithium perchlorate, lithium trifluoromethanesulfonimide, lithium hexafluorophosphate, lithium hexafluoroarsenate, lithium tetrachloroaluminate, tetraalkylammonium salt, lithium chloride, lithium bromide and lithium iodide; in one or several solvents selected from the group consisting of: dioxolane, tetrahydrofuran, dimethoxyethane, diglyme, triglyme, tetraglyme, dialkyl carbonates, sulfolane and butyrolactone.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

EXAMPLES

Example 1

A positive electrode comprising 70% elemental sublimed sulphur (available from Fisher Scientific, Loughborough, UK), 10% electroconductivity carbon black (Ketjenblack® EC-600JD, available from Akzo Nobel Polymer Chemicals BV, Netherlands) and 20% polyethylene oxide (PEO, 4,000,000 molecular weight, available from Sigma-Aldrich Company Ltd., Gillingham, UK) was produced by the following procedure.

A dry mixture of these components was ground in a high-speed Microtron® MB550 mill for 10-15 minutes. Then acetonitrile was added as a solvent to the dry mixture and the suspension was mixed for 15-20 hours with a DLH laboratory stirrer. The solids content of the suspension was 10-15%. The suspension thus produced was applied by an automatic film applicator Elcometer® SPRL to one side of a 12 µm thick aluminium foil with an electroconductive carbon coating (Product No. 60303 available from Rexam Graphics, South Hadley, Mass.) as a current collector.

The coating was dried at ambient conditions for 20 hours and then in a vacuum at 50° C. for 5 hours. The resulting dry cathode active layer had a thickness of 19 µm and contained 2.01 mg/cm$^2$ of cathode mixture. The specific surface capacity of the electrode was 2.35 mA*h/cm$^2$.

Example 2

The positive electrode from the Example 1 was used in a small assembly cell made of stainless steel. The cathode surface area was 5.1 cm$^2$. A pressure of 400 kg/cm$^2$ was applied to the electrode before it was used in the cell. The cathode thickness after pressing was 16 µm. A 1.0M solution of lithium trifluoromethanesulphonate (available from 3M Corporation, St. Paul, Minn.) in sulfolane was used as an electrolyte. Celgard® 2500 (a trade mark of Tonen Chemical Corporation, Tokyo, Japan, and also available from Mobil Chemical Company, Films Division, Pittsford, N.Y.) was used as a separator. These components were assembled to form a laminated structure comprising positive electrode/separator/anode together with the liquid electrolyte filling up the free volume of the separator and the positive electrode. The cells were assembled as follows. The positive electrode was inserted into the cell. Then 4 microliters of electrolyte were deposited onto the electrode by using a constant rate syringe CR-700 (Hamilton Co.). The separator was placed on top of the wetted electrode and 3 microliters of electrolyte were deposited onto the separator. Then a lithium electrode made of 38 µm thick lithium foil was placed on top of the separator. After the electrode stack was assembled, the cell was hermetically sealed by a lid containing a Teflon® coating or sealing. The ratio of sulphur to electrolyte was 1 ml of electrolyte to 1 g of sulphur. After complete dissolution of the sulphur in the form of lithium polysulphide during discharge of the cell, the maximum sulphur concentration in the electrolyte was determined as 31.25 mole/liter.

Charge-discharge cycling of the cell was carried out at a current of 1.5 mA which was equivalent to a current density of 0.3 mA/cm$^2$ with a discharge cut-of voltage at 1.5V and charge termination at 2.8V. The total weight of the cell and the weight distribution between elements of the cell are given in the Table 1, with properties of the cell being shown in Table 2.

The specific energy of the cell was calculated from the capacity at the second cycle by dividing the capacity by the weight of the electrode stack including the electrolyte.

TABLE 1

Weight distribution between components of lithium-sulphur cell from Example 2

| Component of the cell | Weight, g | Part, % |
| --- | --- | --- |
| Lithium | 0.00551 | 13.1 |
| Sulphur | 0.00715 | 17 |
| Binder | 0.00204 | 4.8 |
| Carbon | 0.00102 | 2.4 |
| Substrate (+) | 0.01021 | 24.3 |
| Separator | 0.00613 | 14.6 |
| Electrolyte | 0.01001 | 23.8 |
| Total weight of the cell | 0.04207 | 100.0 |

TABLE 2

Parameters of lithium-sulphur cell from Example 2

| | |
| --- | --- |
| Total quantity of electrolyte, ml | 0.007 |
| Electrolyte quantity per 1 g of sulphur, ml | 1 |
| Electrolyte quantity per 1 mAh of positive electrode capacity, ml/mAh | 0.00058 |
| Calculated lithium polysulphide concentration in electrolyte after the 1st stage, mole/litre | 31.25 |
| Specific energy, Wh/kg | 119 |
| Energy density, Wh/l | 130 |

Example 3

A lithium-sulphur cell was assembled in the same way as described in Example 2, except in that 11 microliters of electrolyte were deposited onto the positive electrode and 3 microliters of electrolyte were deposited onto the separator. The total electrolyte content in the cell was 14 microliters, which amounts to 2 ml of electrolyte per 1 g of sulphur. Cycling of the cell was performed in the same way as in Example 2. The parameters of the cell are shown in Tables 3 and 4.

TABLE 3

Weight distribution between components of lithium-sulphur cell from Example 3

| Component of the cell | Weight, g | Part, % |
| --- | --- | --- |
| Lithium | 0.00551 | 10.6 |
| Sulphur | 0.00715 | 13.7 |
| Binder | 0.00204 | 3.9 |
| Carbon | 0.00102 | 2 |
| Substrate (+) | 0.01021 | 19.6 |
| Separator | 0.00613 | 11.8 |
| Electrolyte | 0.02002 | 38.4 |
| Total weight of the cell | 0.05208 | 100 |

TABLE 4

Parameters of lithium-sulphur cell from Example 3

| | |
| --- | --- |
| Total electrolyte quantity, ml | 0.014 |
| Electrolyte quantity per 1 g of sulphur, ml | 1.96 |
| Electrolyte quantity per 1 mAh of a positive electrode, ml/mAh | 0.00117 |
| Calculated lithium polysulphide concentration in electrolyte after the 1st stage, mole/litre | 15.62 |
| Specific energy, Wh/kg | 265 |
| Energy density, Wh/l | 301 |

Example 4

A lithium-sulphur cell was assembled in the same way as described in Example 2, except in that 22 microliters of the electrolyte were deposited onto the positive electrode and 3 microliters of electrolyte were deposited onto the separator. The total electrolyte content of the cell was 25 microliters, which corresponds to 3.5 ml of electrolyte per 1 g of sulphur. Cycling of the cell was performed in the same way as in Example 2. The parameters of the cell are shown in Tables 5 and 6.

TABLE 5

Weight distribution between components of lithium-sulphur cell from Example 4

| Component of the cell | Weight, g | Part, % |
| --- | --- | --- |
| Lithium | 0.00551 | 8.2 |
| Sulphur | 0.00715 | 10.8 |
| Binder | 0.00204 | 3 |
| Carbon | 0.00102 | 1.5 |
| Substrate (+) | 0.01021 | 15.2 |
| Separator | 0.00613 | 9.1 |
| Electrolyte | 0.03504 | 52.2 |
| Total weight of the cell | 0.0671 | 100.0 |

TABLE 6

Parameters of lithium-sulphur cell from Example 4

| | |
| --- | --- |
| Total electrolyte quantity, ml | 0.025 |
| Electrolyte quantity for 1 g of sulphur, ml | 3.5 |
| Electrolyte quantity for 1 mAh of positive electrode capacity, ml/mAh | 0.0021 |
| Calculated lithium polysulphide concentration in electrolyte after the 1st stage, mole/litre | 8.928 |
| Specific energy, Wh/kg | 300 |
| Energy density, Wh/l | 355 |

Example 5

A lithium-sulphur cell was assembled in the same way as described in Example 2, except in that 49 microliters of electrolyte were deposited onto the positive electrode and 3 microliters of electrolyte were deposited onto the separator. The total electrolyte content of the cell was 52 microliters, which is 5.2 ml of electrolyte per 1 g of sulphur. Cycling of the cell was performed in the same way as in Example 2. The parameters of the cell are shown in Tables 7 and 8.

TABLE 7

Weight distribution between components of the lithium-sulphur cell from Example 5

| Component of the cell | Weight, g | Part, % |
| --- | --- | --- |
| Lithium | 0.00551 | 5.3 |
| Sulphur | 0.00715 | 6.9 |
| Binder | 0.00204 | 2 |
| Carbon | 0.00102 | 1 |
| Substrate (+) | 0.01021 | 9.8 |
| Separator | 0.00613 | 5.8 |
| Electrolyte | 0.07207 | 69.2 |
| Total weight of the cell | 0.10413 | 100.0 |

TABLE 8

Parameters of the lithium-sulphur cell from Example 5

| | |
| --- | --- |
| Total electrolyte quantity, ml | 0.052 |
| Electrolyte quantity per 1 g of sulphur, ml | 7.2 |
| Electrolyte quantity per 1 mAh of positive electrode, ml/mAh | 0.0043 |
| Calculated lithium polysulphide concentration in electrolyte after the 1st stage, mole/litre | 4.344 |
| Specific energy, Wh/kg | 193 |
| Energy density, Wh/l | 242 |

Example 6

A lithium-sulphur cell was assembled in the same way as described in Example 2, except in that 69 microliters of electrolyte were deposited onto the positive electrode and 3 microliters of electrolyte were deposited onto the separator. The total electrolyte content of the cell was 72 microliters, which amounts to 7.2 ml of electrolyte per 1 g of sulphur. Cycling of the cell was performed in the same way as in Example 2. The parameters of the cell are shown in Tables 9 and 10.

TABLE 9

Weight distribution between components of lithium-sulphur cell from Example 6

| Component of the cell | Weight, g | Part, % |
| --- | --- | --- |
| Lithium | 0.00551 | 4.2 |
| Sulphur | 0.00715 | 5.5 |
| Binder | 0.00204 | 1.5 |
| Carbon | 0.00102 | 0.8 |
| Substrate (+) | 0.01021 | 7.7 |
| Separator | 0.00613 | 4.6 |
| Electrolyte | 0.1001 | 75.7 |
| Total weight of the cell | 0.13216 | 100.0 |

TABLE 10

Parameters of lithium-sulphur cell from Example 6

| | |
| --- | --- |
| Total electrolyte quantity, ml | 0.072 |
| Electrolyte quantity for 1 g of sulphur, ml | 10 |
| Electrolyte quantity for 1 mAh of positive electrode capacity, ml/mAh | 0.006 |
| Calculated lithium polysulphide concentration in electrolyte after the 1st stage, mole/litre | 3.128 |
| Specific energy, Wh/kg | 162 |
| Energy density, Wh/l | 207 |

Example 7

The ultimate or saturation solubility of sulphur in the form of lithium octasulphide in 1.0M solution of lithium trifluoromethanesulphonate in sulfolane was evaluated. The evaluation of solubility was carried out in the following way: 1.0 g of a mixture of lithium sulphide and sulphur (the content of sulphur in the mixture was 0.86 g) was taken in a molar ratio 1:7 and placed in a sealed glass reactor in an air thermostat, the reactor being fitted with a mechanical blender and a metering device. The thermostat temperature was set to 30° C. A 1.0M solution of lithium trifluoromethanesulphonate in sulfolane was added in small portions to the reactor under constant mixing. After addition of each new portion the reaction mixture was thoroughly mixed for 5-6 hours so as to establish a thermodynamic equilibrium. The solubility of the solid phase was evaluated visually. If the reaction mixture contained some solid phase residues, then a further portion of electrolyte was added. The experiment was carried out until the solid phase dissolved completely. The results showed that 1.0 g of a mixture of lithium sulphide and sulphur taken in the molar ratio 1:7 was fully dissolved in 3.3 ml of the electrolyte solution; in other words the solubility of sulphur in form of lithium octasulphide was established to be about 0.96M/liter of electrolyte.

Example 8

The results of Examples 2-7 are summarised in FIG. 1 which shows a non-limiting example of the dependence of specific energy of a bare lithium-sulphur cell versus the ratio of electrolyte:sulphur. Other curves may be relevant to other embodiments. It can be seen that this dependence has a maximum which is reached at a ratio of electrolyte:sulphur close to 3. In other words, the maximum capacity of a lithium-sulphur cell is reached at a volume-weight ratio of electrolyte:sulphur that is close to the ultimate or saturation solubility of lithium octasulphide in electrolyte.

The presence of the maximum is explained by the fact that at low values of the electrolyte:sulphur ratio the efficiency of sulphur utilization is low, while at higher ratios the excess of electrolyte contributes just an additional mass to the cell thus resulting in a decrease of the specific energy.

It will be appreciated by persons skilled in the art that the present invention is not limited to what has been particularly shown and described hereinabove.

The invention claimed is:

1. A chemical source of electric energy comprising a positive electrode (cathode) including sulphur or sulphur-based organic compounds, sulphur-based polymeric compounds or sulphur-based inorganic compounds as a depolarizer, a negative electrode (anode) made of metallic lithium or lithium-containing alloys, and an electrolyte comprising a solution of at least one salt in at least one aprotic solvent,
  wherein the chemical source of electric energy is configured to generate soluble polysulphides in the electrolyte during a first stage of a two stage discharge process; and
  wherein the quantity of sulphur in the depolariser and the volume of electrolyte are selected in a way that, after the first stage discharge of the cathode, the concentration of the soluble polysulphides in the electrolyte is seventy percent (70%) to ninety percent (90%) of a saturation concentration of the polysulphides in the electrolyte so as to enhance the specific energy characteristics of the chemical source of electric energy.

2. The chemical source of electric energy of claim 1 wherein the depolarizer includes sulphur, carbon black and polyethylene oxide.

3. The chemical source of electric energy of claim 1 wherein the electrolyte comprises a solution of one or more lithium salts selected form the group consisting of lithium trifluoromethanesulphonate, lithium perchlorate, lithium trifluoromethanesulfonimide, lithium hexafluorophosphate, lithium hexafluoroarsenate, lithium tetracholoroaluminate, tetraalkylammonium salt, lithium chloride, lithium bromide and lithium iodide; in one or more solvents selected from the group consisting of dioxolane, tetrahydrofuran, dimethoxyethane, diglyme, triglyme, tetraglyme, dialkyl carbonates, sulfolane and butyrolactone.

4. The chemical source of electric energy of claim 3 wherein the electrolyte comprises a solution of one or more lithium salts selected from the group consisting of lithium trifluoromethanesulphonate, lithium perchlorate, lithium trifluoromethanesulfonimide, lithium hexafluorophosphate, lithium hexafluoroarsenate, lithium tetracholoroaluminate, tetraalkylammonium salt, lithium chloride, lithium bromide and lithium iodide; in a solvent comprising sulfolane.

5. The chemical source of electric energy of claim 1, wherein the electrolyte comprises a sulfone.

6. The chemical source of electric energy of claim 5, wherein the electrolyte comprises sulfolane.

\* \* \* \* \*